(12) United States Patent
Hisaoka

(10) Patent No.: US 11,156,282 B2
(45) Date of Patent: Oct. 26, 2021

(54) WORK VEHICLE

(71) Applicant: Iseki & Co., LTD, Ehime-ken (JP)

(72) Inventor: Yasuhiro Hisaoka, Ehime-ken (JP)

(73) Assignee: ISEKI & CO., LTD., Matsuyama (JP)

( * ) Notice: Subject to any disclaimer, the term of this patent is extended or adjusted under 35 U.S.C. 154(b) by 89 days.

(21) Appl. No.: 16/711,759

(22) Filed: Dec. 12, 2019

(65) Prior Publication Data

US 2020/0191249 A1 Jun. 18, 2020

(30) Foreign Application Priority Data

Dec. 13, 2018 (JP) .............................. JP2018-233148

(51) Int. Cl.
*F16H 48/24* (2006.01)
*B60T 8/32* (2006.01)
*B60T 1/06* (2006.01)
*F16H 48/08* (2006.01)

(52) U.S. Cl.
CPC .............. *F16H 48/24* (2013.01); *B60T 1/062* (2013.01); *B60T 8/3215* (2013.01); *F16H 48/08* (2013.01)

(58) Field of Classification Search
CPC ........ B60T 1/062; B60T 8/3215; F16H 48/08; F16H 48/24; F16D 2500/111
See application file for complete search history.

(56) References Cited

U.S. PATENT DOCUMENTS

| 3,439,785 | A | * | 4/1969 | Hughson | F16H 48/22 192/221 |
| 5,673,776 | A | * | 10/1997 | Fitch | B60T 1/062 192/218 |
| 8,056,697 | B2 | * | 11/2011 | Eley | B60W 30/1819 192/218 |
| 8,376,907 | B2 | * | 2/2013 | Poulin | B60T 1/062 477/35 |
| 2010/0200341 | A1 | * | 8/2010 | Matsubayashi | B60T 11/04 188/71.7 |

FOREIGN PATENT DOCUMENTS

JP 11-192849 A 7/1999

* cited by examiner

*Primary Examiner* — David R Morris
*Assistant Examiner* — Lori Wu
(74) *Attorney, Agent, or Firm* — Finnegan, Henderson, Farabow, Garrett & Dunner LLP

(57) ABSTRACT

Provided is a work vehicle having a compact braking device. The work vehicle includes a drive shaft part to which power generated by a power source is transmitted and which transmits the power to drive wheels via a differential device, and a drive shaft braking mechanism which generates a braking force on the drive shaft part when a brake pedal is depressed.

11 Claims, 7 Drawing Sheets

WORK VEHICLE

CROSS REFERENCE TO RELATED APPLICATIONS

This application claims priority to Japanese Patent Application No. 2018-233148, filed Dec. 13, 2018, the disclosure of which is incorporated herein by reference in its entirety.

BACKGROUND

The present disclosure relates to a work vehicle.

Conventionally, there is known a work vehicle which includes a left brake and a right brake for respectively braking left and right rear wheels. One of these brakes generates a braking force when a left brake pedal or a right brake pedal is depressed (see e.g., Japanese Patent Application Pub. No. JP-A-11-192849).

In such a work vehicle, the left brake pedal and the right brake pedal can be connected to generate a braking force simultaneously on the left and right brakes.

SUMMARY

However, in the conventional work vehicle as described above, a braking force is generated on the axle of the rear wheel which is subjected to a large torque during travelling, so that the braking device becomes large.

The present disclosure has been made in view of the above problem, and an object thereof may be to provide a work vehicle having a compact braking device.

In order to address the above problems and achieve the object, a work vehicle (e.g., tractor 1) may be provided. According to one aspect, a work vehicle includes a drive shaft part (22) to which power generated by a power source (13) is transmitted and which transmits the power to drive wheels (8) via a differential device (25), and a drive shaft braking mechanism (20) which generates a braking force on the drive shaft part (22) when a brake pedal (81) is depressed.

According to an aspect, the braking device of the working vehicle may be made compact.

Objects and advantages of the disclosed embodiments may be realized and attained by the elements and combinations that may be set forth in the claims. However, embodiments of the present disclosure are not necessarily required to achieve such exemplary objects and advantages, and some embodiments may not achieve any of the objects and advantages discussed above.

DETAILED DESCRIPTION

Figure 1:
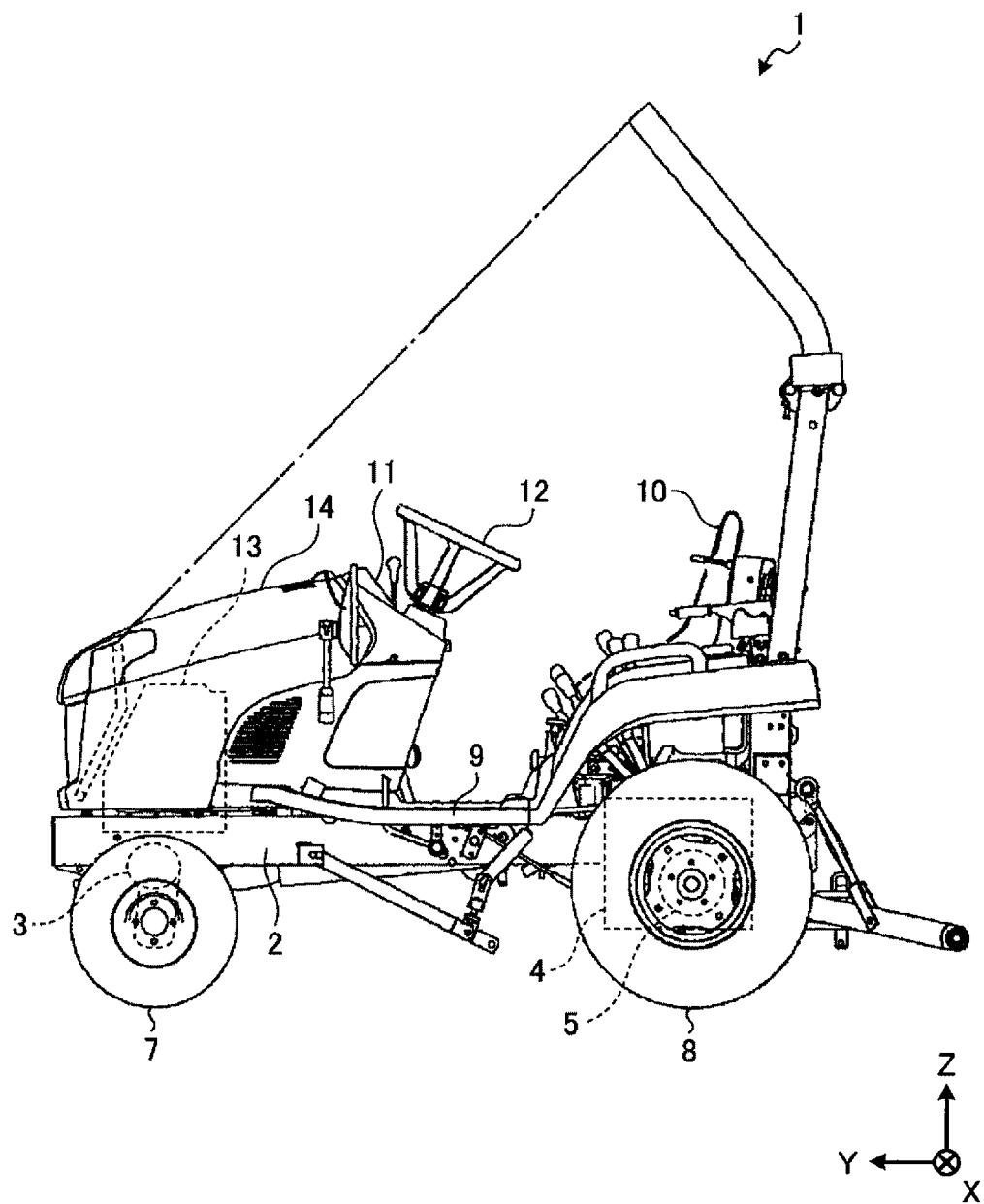
FIG. 1 is a schematic side view of a work vehicle.

Hereinafter, an exemplary embodiment of a work vehicle will be described in detail with reference to the accompanying drawings. Meanwhile, the present invention is not limited to the embodiments described below. FIG. 1 is a schematic side view of an example of a work vehicle. In the following description, a tractor 1 will be described as an example of the work vehicle.

In the drawings referenced below, to aid in understanding, an orthogonal coordinate system may be indicated in which an X-axis direction, a Y-axis direction, and a Z-axis direction orthogonal to each other are defined and a positive Z-axis direction is defined as a vertical upward direction.

Further, in the present disclosure, a front and rear direction may be defined with a positive Y-axis direction as the front side and a negative Y-axis direction as the rear side, and a left and right direction may be defined with a positive X-axis direction as the right side and a negative X-axis direction as the left side. In addition, an upper and lower direction may be defined with a positive Z-axis direction as the upper side and a negative Z-axis direction as the lower side.

Further, the front and rear direction may refer to the front and rear direction of the tractor 1. More specifically, the front and rear direction may refer to the travel direction when the tractor 1 goes straight. The front side in the travel direction may be defined as "the front," and the rear side may be defined as "the rear." Further, in a state where a worker (also called an operator) sits on a seat 10 and faces forward, the left hand side is "the left," and the right hand side is "the right."

The tractor 1 includes a front axle 3 swingably attached to the front lower side of a vehicle body frame 2, a transmission case 4 swingably attached to the rear lower side of the vehicle body frame 2, and a pair of rear axle housings 5 extending in the left and right direction from the transmission case 4.

The front axle 3 includes a pair of left and right front wheels 7. The rear axle housing 5 includes a pair of left and right rear wheels 8.

Further, the tractor 1 includes a step floor 9 at an intermediate portion of the vehicle body frame 2 in the front and rear direction. In a control area above the step floor 9, the seat 10, a control panel 11, a steering handle 12, various operation levers, and various operation pedals are provided.

Further, the tractor 1 includes an engine 13 (power source) supported on the vehicle body frame 2 in front of the step floor 9 and a bonnet 14 covering the engine 13. The tractor 1 is adapted to travel by transmitting the power generated by the engine 13 to the rear wheels 8 via a drive shaft part 22 (see FIG. 2) and the like.

Figure 2:
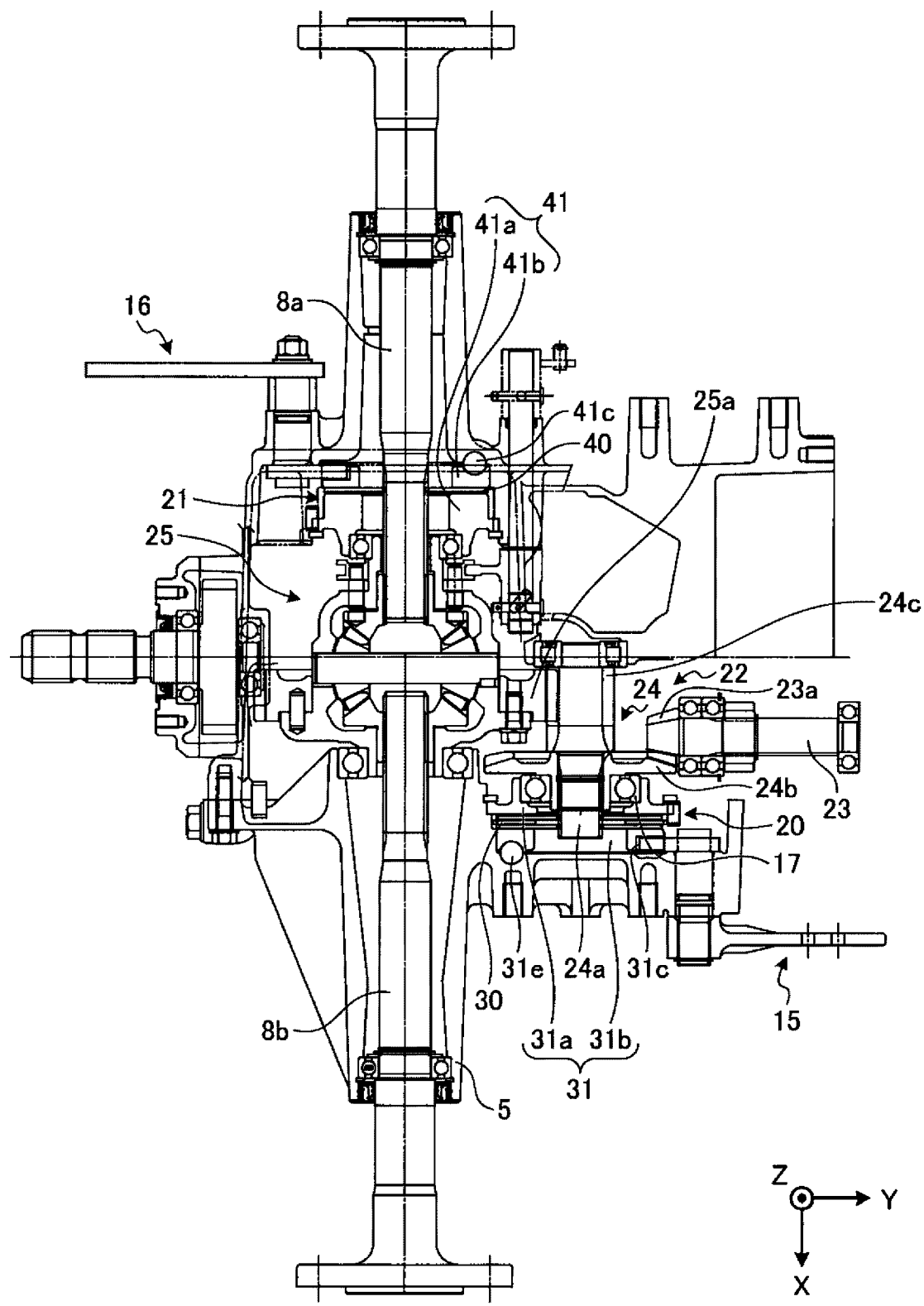
FIG. 2 is a view showing the configuration of a tractor in the vicinity of a rear axle housing.

Subsequently, the configurations of braking mechanisms 20, 21 of the tractor 1 will be described with reference to FIG. 2. FIG. 2 is a view showing the configuration of the tractor 1 in the vicinity of the rear axle housing 5.

The tractor 1 includes a drive shaft braking mechanism 20 and an axle braking mechanism 21. The drive shaft braking mechanism 20 brakes the rear wheels 8 by generating a braking force on the drive shaft part 22.

Meanwhile, the drive shaft part 22 includes a propeller shaft 23 to which the power generated by the engine 13 (see FIG. 1) is transmitted, and a gear part 24. The gear part 24 has a first gear 24b rotating together with a shaft 24a and a second gear 24c rotating together with the shaft 24a.

The first gear 24b is a bevel gear and meshes with a bevel gear 23a provided at the tip of the propeller shaft 23. The second gear 24c is, for example, a spur gear and meshes with a final gear 25a of a differential device 25.

The drive shaft braking mechanism 20 includes a disc 30 rotating together with the shaft 24a of the drive shaft part 22 and a clamping part 31 capable of clamping the disc 30 according to the pivoting of a drive shaft braking arm 15.

The clamping part 31 has a fixed portion 31a and a movable portion 31b. The fixed portion 31a is fixed to the rear axle housing 5. Meanwhile, the fixed portion 31a supports the shaft 24a of the drive shaft part 22 to be rotatable via a bearing 17.

Figure 3:
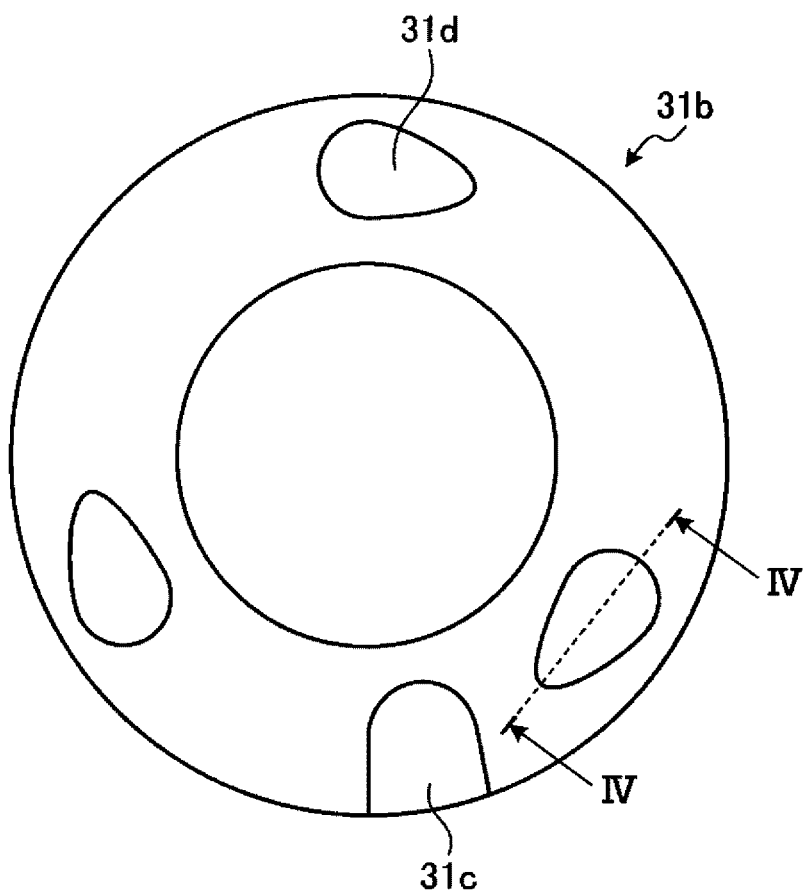
FIG. 3 is a schematic view showing a movable portion.
Figure 4:
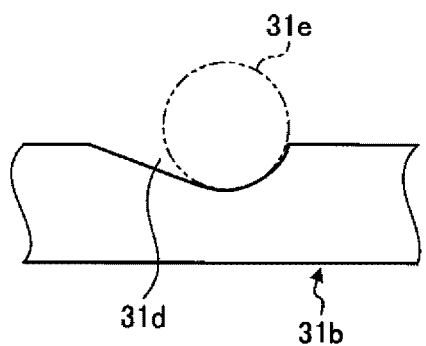
FIG. 4 is a sectional view taken along the line IV-IV in FIG. 3.

The movable portion 31b is formed in an annular shape, as shown in FIG. 3. The movable portion 31b has an engagement hole 31c with which the drive shaft braking arm 15 engages and a ball hole 31d in which a part of a ball 31e is accommodated. FIG. 3 is a schematic view showing the movable portion 31b. A plurality of ball holes 31d is formed. As shown in FIG. 4, each of the ball holes 31d is formed so that its bottom surface is inclined. FIG. 4 is a sectional view taken along the line IV-IV in FIG. 3.

The movable portion 31b can be pivoted by the drive shaft braking arm 15. The movable portion 31b does not come into contact with the disc 30 when the balls 31e accommodated in the ball holes 31d are in a non-operation position where the depth of the ball holes 31d is deep. Therefore, in the case where the balls 31e are in the non-operation position, the drive shaft braking mechanism 20 does not generate a braking force on the drive shaft part 22, so that the rear wheels 8 do not brake.

Further, when the movable portion 31b is pivoted by the drive shaft braking arm 15 from the state where the balls 31e are in the non-operation position, the movable portion 31b moves toward the disc 30 along an axial direction of the shaft 24a with respect to the balls 31e and comes into contact with the disc 30. In this way, the clamping part 31 clamps the disc 30 and the drive shaft braking mechanism 20 generates a braking force on the drive shaft part 22 to brake the rear wheels 8.

The axle braking mechanism 21 generates a braking force on one of axles 8a, 8b of the rear wheels 8. For example, the axle braking mechanism 21 generates a braking force on the axle 8a of the left rear wheel 8.

The axle braking mechanism 21 includes a disc 40 rotating together with the axle 8a and a clamping part 41 capable of clamping the disc 40 according to the pivoting of an axle braking arm 16.

The clamping part 41 has a fixed portion 41a and a movable portion 41b. The fixed portion 41a is fixed to the rear axle housing 5.

The configuration of the movable portion 41b is the same as that of the movable portion 31b of the drive shaft braking mechanism 20, and detailed description thereof is omitted. The movable portion 41b does not come into contact with the disc 40 when balls 41c are in a non-operation position. Therefore, the axle braking mechanism 21 does not generate a braking force on the axle 8a, so that the rear wheels 8 do not brake.

Further, the movable portion 41b can be pivoted by the axle braking arm 16. When the movable portion 41b is pivoted by the axle braking arm 16 from the state where the balls 41c are in the non-operation position, the movable portion 41b moves toward the disc 40 along an axial direction of the axle 8a with respect to the balls 41c and comes into contact with the disc 40. In this way, the clamping part 41 clamps the disc 40 and the axle braking mechanism 21 generates a braking force on the axle 8a to brake the rear wheels 8.

Figure 5:
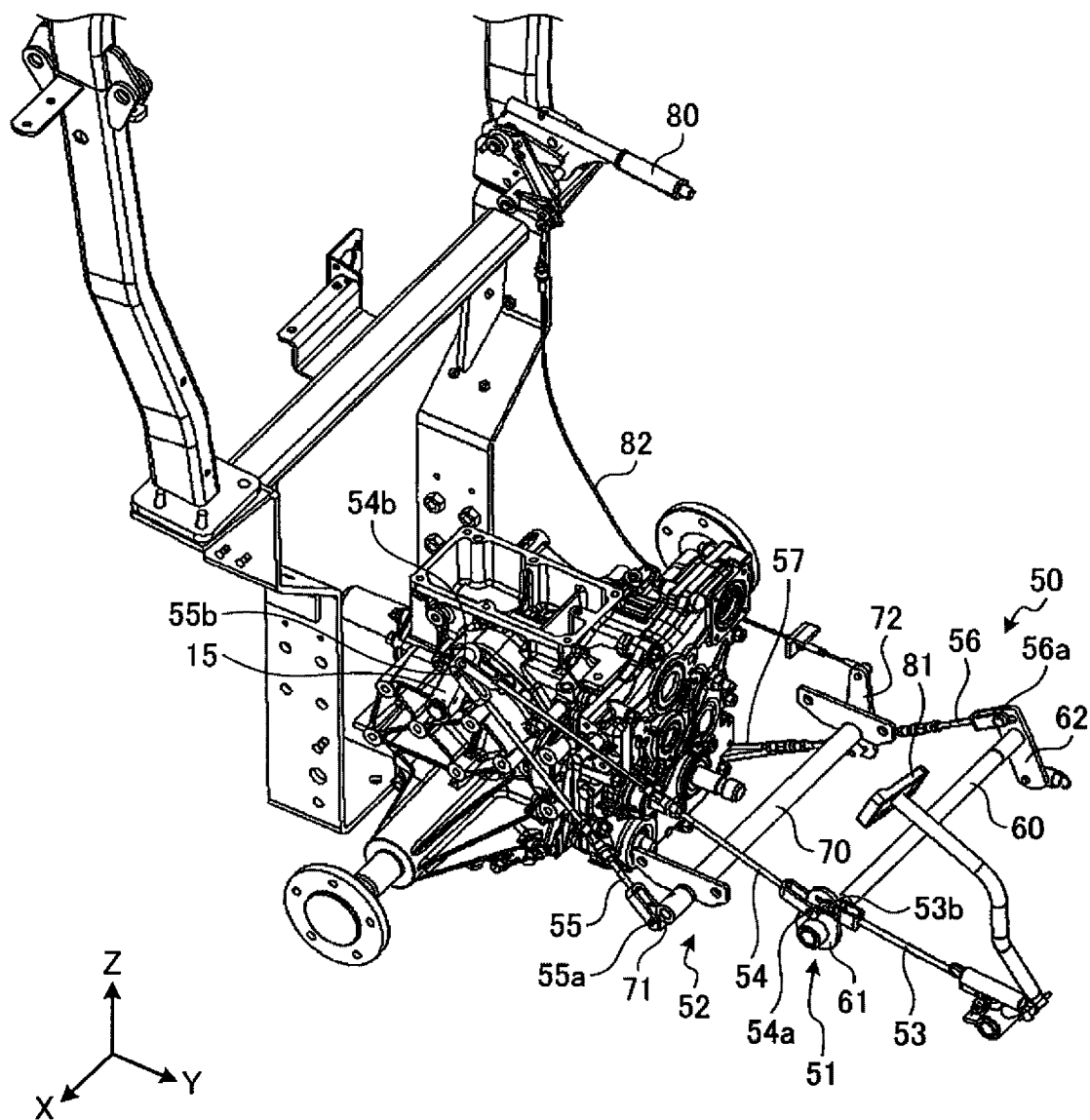
FIG. 5 is a right front perspective view showing a part of the tractor.
Figure 6:
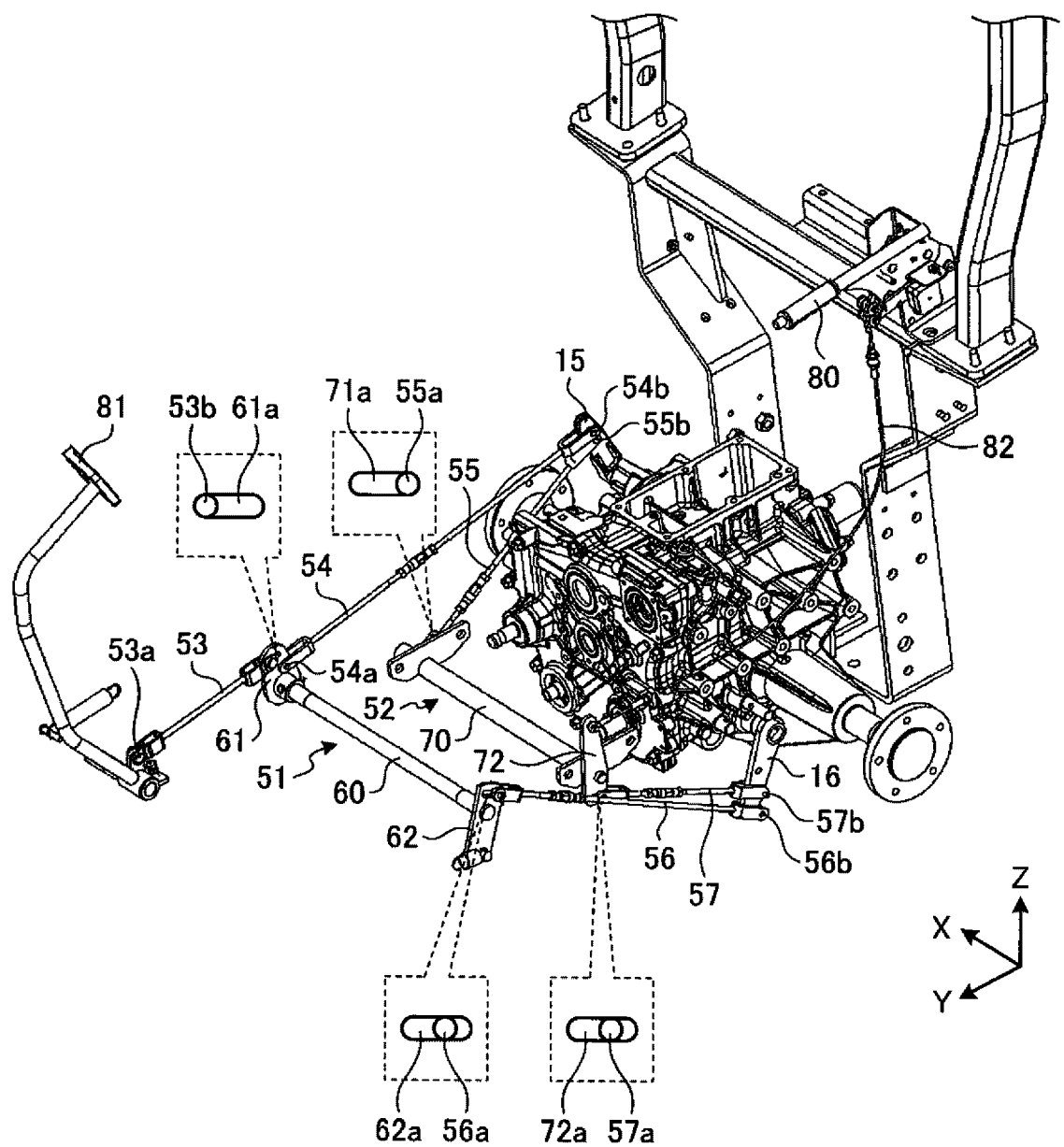
FIG. 6 is a left front perspective view showing a part of the tractor.

Subsequently, a link mechanism 50 for actuating the drive shaft braking mechanism 20 and the axle braking mechanism 21 will be described with reference to FIGS. 5 and 6. FIG. 5 is a right front perspective view showing a part of the tractor 1. FIG. 6 is a left front perspective view showing a part of the tractor 1.

The link mechanism 50 includes a first pivot part 51, a second pivot part 52, a first link 53, a second link 54, a third link 55, a fourth link 56, and a fifth link 57.

The first pivot part 51 includes a pivot shaft 60, a first pivot plate 61, and a second pivot plate 62. The pivot shaft 60 extends in the left and right direction and is pivotably supported on the vehicle body frame 2, for example.

The first pivot plate 61 is attached to a right end of the pivot shaft 60 and is pivoted integrally with the pivot shaft 60. A first mounting hole 61a and a second mounting hole (not shown) are formed in the first pivot plate 61. The first mounting hole 61a is an opening with an elongated shape.

The second pivot plate 62 is attached to a left end of the pivot shaft 60 and is pivoted integrally with the pivot shaft 60. A mounting hole 62a is formed in the second pivot plate 62. The mounting hole 62a is an opening with an elongated shape.

The second pivot part 52 includes a pivot shaft 70, a first pivot plate 71, and a second pivot plate 72. The pivot shaft 70 extends in the left and right direction and is pivotably supported on the vehicle body frame 2, for example.

The first pivot plate 71 is attached to a right end of the pivot shaft 70 and is pivoted integrally with the pivot shaft 70. A mounting hole 71a is formed in the first pivot plate 71. The mounting hole 71a is an opening with an elongated shape.

The second pivot plate 72 is attached to a left end of the pivot shaft 70 and is pivoted integrally with the pivot shaft 70. A first mounting hole (not shown) and a second mounting hole 72a are formed in the second pivot plate 72. The second mounting hole 72a is an opening with an elongated shape. The second pivot plate 72 is connected to a brake lever 80 via a wire 82. The wire 82 is attached to the first mounting hole of the second pivot plate 72.

The first link 53 connects a brake pedal 81 and the first pivot part 51. Specifically, the first link 53 connects the brake pedal 81 and the first pivot plate 61 of the first pivot part 51. The first link 53 is pivotably attached to the brake pedal 81 and the first pivot plate 61.

A first pin 53a is provided at a front end of the first link 53 and is pivotably inserted into a mounting hole (not shown) provided in the brake pedal 81. A second pin 53b is provided at a rear end of the first link 53 and is slidably inserted into the first mounting hole 61a of the first pivot plate 61, as shown in FIG. 6. Meanwhile, FIG. 6 schematically shows the relationship between the first mounting hole 61a and the second pin 53b of the first link 53 and does not limit the shape or the like of the first mounting hole 61a. The same applies to the other mounting holes 62a, 71a, 72a.

In a released state where the brake pedal 81 and the brake lever 80 are not operated, the second pin 53b of the first link 53 may contact the front end of the first mounting hole 61a.

The second link 54 connects the first pivot part 51 and the drive shaft braking arm 15. Specifically, the second link 54 connects the first pivot plate 61 of the first pivot part 51 and the drive shaft braking arm 15. The second link 54 is pivotably attached to the first pivot plate 61 and the drive shaft braking arm 15. A first pin 54a is provided at a front end of the second link 54 and is pivotably inserted into a second mounting hole (not shown) of the first pivot plate 61. A second pin 54b is provided at a rear end of the second link 54 and is pivotably inserted into a first mounting hole (not shown) of the drive shaft braking arm 15.

The third link 55 connects the second pivot part 52 and the drive shaft braking arm 15. Specifically, the third link 55 connects the first pivot plate 71 of the second pivot part 52 and the drive shaft braking arm 15. The third link 55 is pivotably attached to the first pivot plate 71 and the drive shaft braking arm 15.

As shown in FIG. 6, a first pin 55a is provided at a front end of the third link 55 and is slidably inserted into the mounting hole 71a of the first pivot plate 71. In the released state, the first pin 55a of the third link 55 may contact the rear end of the mounting hole 71a.

A second pin 55b is provided at a rear end of the third link 55 and is pivotably inserted into a second mounting hole (not shown) formed in the drive shaft braking arm 15.

The fourth link 56 connects the first pivot part 51 and the axle braking arm 16. Specifically, the fourth link 56 connects the second pivot plate 62 of the first pivot part 51 and the axle braking arm 16. The fourth link 56 is pivotably attached to the second pivot plate 62 and the axle braking arm 16.

As shown in FIG. 6, a first pin 56a is provided at a front end of the fourth link 56 and is slidably inserted into the mounting hole 62a of the second pivot plate 62. In the released state, the first pin 56a of the fourth link 56 may be configured so that a gap is formed between the first pin 56a and the front end of the mounting hole 62a and between the first pin 56a and the rear end of the mounting hole 62a.

A second pin 56b is provided at a rear end of the fourth link 56 and is pivotably inserted into a first mounting hole (not shown) formed in the axle braking arm 16.

The fifth link 57 connects the second pivot part 52 and the axle braking arm 16. Specifically, the fifth link 57 connects the second pivot plate 72 of the second pivot part 52 and the axle braking arm 16. The fifth link 57 is pivotably attached to the second pivot plate 72 and the axle braking arm 16.

As shown in FIG. 6, a first pin 57a is provided at a front end of the fifth link 57 and is slidably inserted into the second mounting hole 72a of the second pivot plate 72. In the released state, the first pin 57a of the fifth link 57 may be configured so that a gap is formed between the first pin 57a and the front end of the second mounting hole 72a and between the first pin 57a and the rear end of the second mounting hole 72a.

A second pin 57b is provided at a rear end of the fifth link 57 and is pivotably inserted into a second mounting hole (not shown) formed in the axle braking arm 16.

With this configuration, the link mechanism 50 generates a braking force at different timings on the drive shaft braking mechanism 20 and the axle braking mechanism 21 when the brake pedal 81 or the brake lever 80 is operated.

Next, the operation of the link mechanism 50 will be described.

Figure 7:
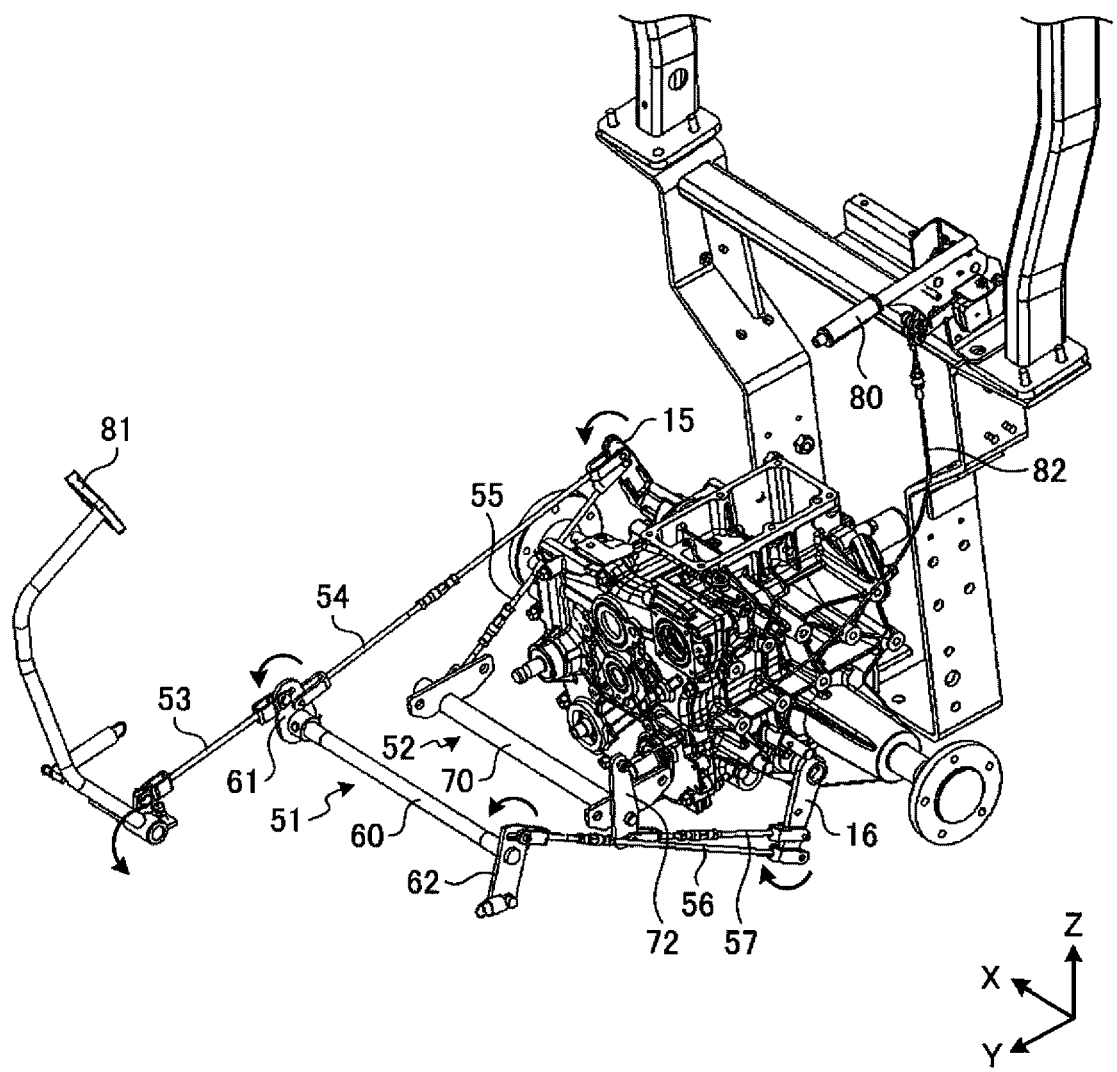
FIG. 7 is a view showing an operation of a link mechanism when a brake pedal is operated.

First, a case where the brake pedal 81 is operated will be described with reference to FIG. 7. FIG. 7 is a view showing the operation of the link mechanism 50 when the brake pedal 81 is operated. In FIG. 7, the portions of the link mechanism 50 that pivot when the brake pedal 81 is operated are indicated by solid arrows.

When the brake pedal 81 is depressed, the first link 53 is urged to move forward relative to the position of the released state. In response to the depression of the brake pedal 81, the first link 53 may move forward. Since the second pin 53b of the first link 53 is in contact with the front end of the first mounting hole 61a of the first pivot plate 61 in the released state (see FIG. 6), the first pivot part 51 pivots forward.

Further, as the first pivot part 51 is pivoted forward, the second link 54 attached to the second mounting hole (not shown) of the first pivot plate 61 moves forward with the pivoting of the first pivot part 51, and the drive shaft braking arm 15 is pivoted forward. The drive shaft braking arm 15 may be pivoted immediately upon pivoting of the first pivot plate caused by operation of the brake pedal 81.

In this way, the drive shaft braking mechanism 20 (see FIG. 2) generates a braking force. Thus, the drive shaft braking mechanism 20 generates a braking force on the drive shaft part 22 as soon as the brake pedal 81 is depressed. In some embodiments, the brake pedal 81 may have such a margin that a braking force is not generated for a predetermined depression amount from the released state. For example, a predetermined dead zone may be provided.

In the released state, a gap is provided between a rear end of the mounting hole 62a and the first pin 56a inserted into the mounting hole 62a (see FIG. 6). Therefore, the fourth link 56 does not move forward until the brake pedal 81 is depressed to such an extent that the first pin 56a comes into contact with the rear end of the mounting hole 62a of the second pivot plate 62. The gap in the second pivot plate 62 may absorb relative motion of the first pin 56a and the second pivot plate 62 until the first pin 56a reaches the rear end of the mounting hole 62a. The mounting hole 62a and the first pin 56a may be configured such that the gap is at least a predetermined amount in the released state.

When the first pin 56a of the fourth link 56 comes into contact with the rear end of the mounting hole 62a of the second pivot plate 62 and the brake pedal 81 is further depressed, the fourth link 56 is urged to move forward with the pivoting of the second pivot plate 62. Further, as the fourth link 56 moves forward, the axle braking arm 16 is pivoted forward.

In this way, the axle braking mechanism 21 (see FIG. 2) generates a braking force. For example, when the brake pedal 81 is depressed, the link mechanism 50 generates a braking force by the axle braking mechanism 21 after generating a braking force by the drive shaft braking mechanism 20.

Meanwhile, a gap is formed between the first pin 55a of the third link 55 and the front end of the mounting hole 71a so that the first pin 55a of the third link 55 does not come into contact with the front end of the mounting hole 71a of the first pivot plate 71 of the second pivot part 52 even when the drive shaft braking arm 15 is pivoted forward via the second link 54 and the third link 55 moves forward with the drive shaft braking arm 15. Therefore, even when the brake pedal 81 is depressed and the drive shaft braking arm 15 is pivoted, the forward pivoting of the drive shaft braking arm 15 is not transmitted to the axle braking arm 16 via the third link 55 and the second pivot part 52.

Further, a gap is formed between the first pin 57a of the fifth link 57 and the front end of the second mounting hole 72a so that the first pin 57a of the fifth link 57 does not contact with the front end of the second mounting hole 72a of the second pivot plate 72 of the second pivot part 52 even when the axle braking arm 16 is pivoted via the fourth link 56. Therefore, even when the brake pedal 81 is depressed and the axle braking arm 16 is pivoted, the forward pivoting of the axle braking arm 16 is not transmitted to the second pivot part 52 via the fifth link 57.

Figure 8:
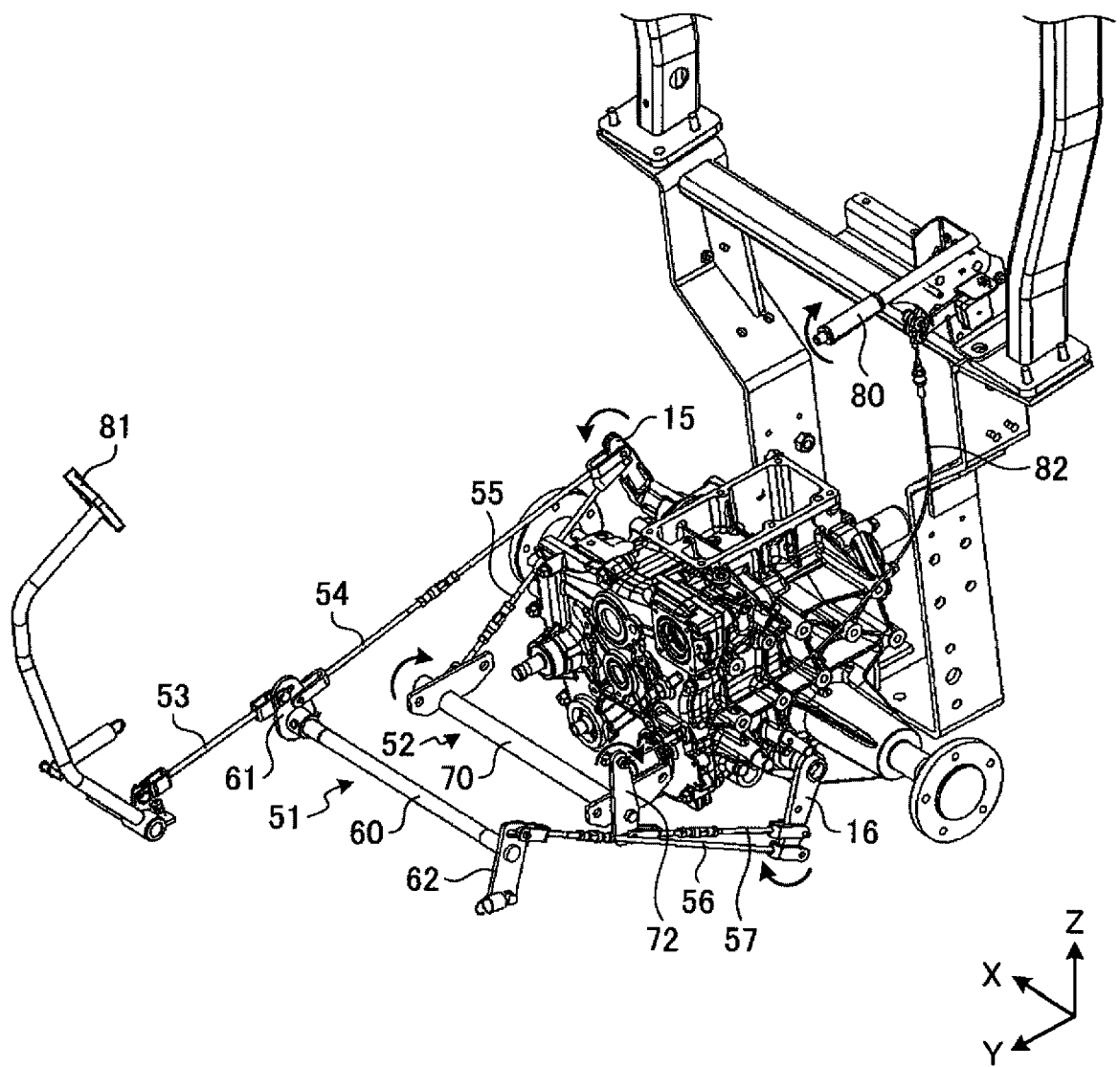
FIG. 8 is a view showing an operation of the link mechanism when a brake lever is operated.

Subsequently, a case where the brake lever 80 is operated will be described with reference to FIG. 8. FIG. 8 is a view showing the operation of the link mechanism 50 when the brake lever 80 is operated. In FIG. 8, the portions of the link mechanism 50 that pivot when the brake lever 80 is operated are indicated by solid arrows.

When the brake lever 80 is operated and pulled upward, the second pivot plate 72 of the second pivot part 52 is urged to pivot relative to the position in the released state. In response to the pulling up of the brake lever 80, the second pivot plate 72 may pivot. Also, the first pivot plate 71 of the second pivot part 52 is pivoted.

Since the first pin 55*a* of the third link 55 is in contact with the rear end of the mounting hole 71*a* of the first pivot plate 71 of the second pivot part 52 in the released state (see FIG. 6), the third link 55 moves forward with the pivoting of the second pivot part 52, and the drive shaft braking arm 15 is pivoted forward by the third link 55.

In this way, the drive shaft braking mechanism 20 (see FIG. 2) generates a braking force. Thus, the drive shaft braking mechanism 20 generates a braking force as soon as the brake lever 80 is pulled upward. In some embodiments, the brake lever 80 may have such a margin that a braking force is not generated for a predetermined pulled-up amount from the released state. For example, a predetermined dead zone may be provided.

In the released state, a gap is provided between the rear end of the second mounting hole 72*a* and the first pin 57*a* inserted into the second mounting hole 72*a* (see FIG. 6). Therefore, the fifth link 57 does not move forward until the brake lever 80 is pulled upward to such an extent that the first pin 57*a* of the fifth link 57 comes into contact with the rear end of the second mounting hole 72*a*. The gap in the second pivot plate 72 may absorb relative motion of the first pin 57*a* and the second pivot plate 72 until the first pin 57*a* reaches the rear end of the mounting hole 72*a*. The second mounting hole 72*a* and the first pin 57*a* may be configured such that the gap is at least a predetermined amount in the released state.

When the first pin 57*a* of the fifth link 57 comes into contact with the rear end of the second mounting hole 72*a* of the second pivot plate 62 and the brake lever 80 is further pulled upward, the fifth link 57 moves forward with the pivoting of the second pivot plate 72. Further, the axle braking arm 16 is pivoted forward with the movement of the fifth link 57.

In this way, the axle braking mechanism 21 (see FIG. 2) generates a braking force. For example, even when the brake lever 80 is pulled upward, a braking force is generated by the axle braking mechanism 21 after a braking force is generated by the drive shaft braking mechanism 20.

Meanwhile, a gap is formed between the first pin 56*a* of the fourth link 56 and the front end of the mounting hole 62*a* of the second pivot plate 62 of the first pivot part 51 even when the axle braking arm 16 is pivoted forward via the fifth link 57 and the fourth link 56 moves forward with the axle braking arm 16 (see FIG. 6). Therefore, even when the brake lever 80 is pulled upward and the axle braking arm 16 is pivoted forward, the pivoting of the axle braking arm 16 is not transmitted to the first pivot part 51 via the fourth link 56.

Further, a gap is formed between the second pin 53*b* of the first link 53 and the rear end of the first mounting hole 61*a* of the first pivot plate 61 of the first pivot part 51 even when the drive shaft braking arm 15 is pivoted forward via the third link 55 and the second link 54 moves forward with the drive shaft braking arm 15 (see FIG. 6). Therefore, even when the brake lever 80 is pulled upward and the drive shaft braking arm 15 is pivoted, the pivoting of the drive shaft braking arm 15 is not transmitted to the first link 53.

In this manner, the brake pedal 81 does not move even when the brake lever 80 is pulled upward. Therefore, in a situation where a worker does not operate the brake pedal 81 but instead operates the brake lever 80 (e.g., by pulling it upward), the brake pedal 81 does not move. In this way, the tractor 1 can suppress giving an uncomfortable feeling to the worker.

Next, some exemplary effects of a tractor consistent with embodiments of the disclosure will be described.

The tractor 1 includes the drive shaft part 22 for transmitting the power generated by the engine 13 to the rear wheels 8 via the differential device 25 when the brake pedal 81 is depressed, and the drive shaft braking mechanism 20 for generating a braking force on the drive shaft part 22.

In this way, the tractor 1 can generate a braking force on the drive shaft part 22 having a smaller torque than the axles 8*a*, 8*b* and can generate a braking force by the drive shaft braking mechanism 20, which may be compact in size. Therefore, the tractor 1 can be reduced in size. Further, the tractor 1 can brake the left and right rear wheels 8 by a single drive shaft braking mechanism 20.

The tractor 1 includes the axle braking mechanism 21 for generating a braking force on the axle 8*a* when the brake lever 80 is pulled upward.

In this way, the tractor 1 can generate a braking force by operating the brake lever 80. For example, it is possible to prevent the tractor 1 from moving while stopped. That is, the tractor 1 can use the axle braking mechanism 21 as a parking brake. Further, the tractor 1 can generate a braking force by the axle braking mechanism 21, which may be compact in size. Therefore, the tractor 1 can be reduced in size.

The tractor 1 includes the link mechanism 50 that actuates the drive shaft braking mechanism 20 and the axle braking mechanism 21 when the brake pedal 81 is depressed.

In this way, the tractor 1 can generate a braking force by two braking mechanisms 20, 21 by operating the brake pedal 81. Therefore, the tractor 1 can stably maintain its stationary state.

The tractor 1 includes the link mechanism 50 that actuates the drive shaft braking mechanism 20 and the axle braking mechanism 21 when the brake lever 80 is pulled upward.

In this way, the tractor 1 can generate a braking force by two braking mechanisms 20, 21 by operating the brake lever 80. Therefore, the tractor 1 can stably maintain its stationary state.

When the brake pedal 81 or the brake lever 80 is operated, the tractor 1 operates the axle braking mechanism 21 after operating the drive shaft braking mechanism 20.

In this way, the tractor 1 can generate a braking force on the axle 8*a* after a braking force is generated on the drive shaft part 22 and a vehicle speed is sufficiently lowered or the tractor is stopped. Therefore, the tractor 1 can prevent a one-side brake that generates a braking force only on the axle 8*a*.

The tractor 1 according to a modification may generate a braking force only by the drive shaft braking mechanism 20 when the brake pedal 81 is depressed. In this way, the tractor 1 according to the modification can prevent a one-side brake when the brake pedal 81 is depressed during travelling.

Further effects and modifications can be easily derived by those skilled in the art. Therefore, the broader aspects of the present invention are not limited to the specific details and representative embodiments shown and described above. Accordingly, various changes can be made without departing from the spirit or scope of the general inventive concept as may be defined by the appended claims and their equivalents.

What is claimed is:

1. A work vehicle comprising:
a drive shaft part to which power generated by a power source is transmitted and which transmits the power to drive wheels via a differential device;
a drive shaft braking mechanism configured to generate a braking force on the drive shaft part when a brake pedal is depressed;
an axle braking mechanism configured to generate a braking force on an axle of the drive wheels when a brake lever is operated; and
a link mechanism configured to actuate the drive shaft braking mechanism and the axle braking mechanism when the brake pedal or the brake lever is operated,
wherein the link mechanism is configured to actuate the axle braking mechanism after actuating the drive shaft braking mechanism when the brake pedal or the brake lever is operated.

2. The work vehicle according to claim 1,
wherein the link mechanism includes a member having a gap configured such that pivoting of the member caused by operation of the brake pedal or the brake lever is absorbed.

3. The work vehicle according to claim 2,
wherein the link mechanism includes a first pivot part that includes: a first pivot plate pivotably attached to the brake pedal, and a second pivot plate that is the member of the link mechanism, wherein the second pivot plate is connected to an axle braking arm of the axle braking mechanism by a link,
an opening is formed in the second pivot plate such that pivoting of the first pivot part is not transmitted to the axle braking arm.

4. The work vehicle according to claim 3,
wherein the opening is configured such that, in a released state, the gap is formed between an end of the opening and a pin connecting the link to the second pivot plate such that the axle braking arm is not pivoted until the brake pedal is operated a predetermined amount.

5. The work vehicle according to claim 3,
wherein the first pivot part is connected to a drive shaft braking arm of the drive shaft braking mechanism by a link, and
the drive shaft braking arm is configured to be immediately pivoted upon pivoting of the first pivot part.

6. The work vehicle according to claim 2,
wherein the link mechanism includes a second pivot part that includes: a first pivot plate connected to a drive shaft braking arm of the drive shaft braking mechanism by a first link, and a second pivot plate that is the member of the link mechanism, wherein the second pivot plate is attached to the brake lever and to an axle braking arm of the axle braking mechanism by a second link,
an opening is formed in the second pivot plate such that pivoting of the second pivot part is not transmitted to the axle braking arm.

7. The work vehicle according to claim 6,
wherein the opening is configured such that, in a released state, the gap is formed between an end of the opening and a pin connecting the second link to the second pivot plate such that the axle braking arm is not pivoted until the brake lever is operated a predetermined amount.

8. The work vehicle according to claim 6,
wherein the drive shaft braking arm is configured to be immediately pivoted upon pivoting of the second pivot part.

9. The work vehicle according to claim 1, wherein the axle braking mechanism and the drive shaft braking mechanism are actuated independently.

10. The work vehicle according to claim 9, further comprising a second pivot part connecting the drive shaft braking mechanism and the axle braking mechanism, the second pivot part including a first pivot plate and a second pivot plate,
wherein the shaft braking mechanism includes a drive shaft braking arm and the axle braking mechanism includes an axle braking arm,
the first pivot plate is connected to the drive shaft braking arm by a link,
the second pivot plate is connected to the axle braking arm by a link, and
a gap is formed in the second pivot plate such that pivoting of the axle braking arm is not transmitted to the second pivot part.

11. A work vehicle comprising:
a drive shaft part to which power generated by a power source is transmitted and which transmits the power to drive wheels via a differential device;
a drive shaft braking mechanism configured to generate a braking force on the drive shaft part when a brake pedal is depressed;
an axle braking mechanism configured to generate a braking force on an axle of the drive wheels when a brake lever is operated; and
an axle braking arm operable between a first state in which a ball engages the movable portion of the clamping part such that the ball causes the movable portion to move toward the disc in the operation position, and a second state in which the ball moves into a ball hole of the movable portion in the non-operation position,
wherein the movable portion is configured to be pivoted by the axle braking arm,
the axle braking mechanism includes: a disc configured to rotate together with the axle, and a clamping part,
the clamping part is configured to be operable between an operation position in which the braking force on the axle is generated through clamping the disc, and a non-operation position;
the first clamping part includes: a fixed portion, and a movable portion, and
the movable portion is configured to contact the disc in the operation position, and to not contact the disc in the non-operation position.

* * * * *